United States Patent [19]

Conrad

[11] Patent Number: 5,333,544
[45] Date of Patent: Aug. 2, 1994

[54] MOBILE PLATFORM FOR OPERATORS OF CALENDERS

[75] Inventor: Hans-Rolf Conrad, Dormagen, Fed. Rep. of Germany

[73] Assignee: Sulzer Papertec Krefeld GmbH, Krefeld, Fed. Rep. of Germany

[21] Appl. No.: 72,543

[22] Filed: Jun. 4, 1993

[30] Foreign Application Priority Data

Jun. 11, 1992 [DE] Fed. Rep. of Germany ... 9207852[U]

[51] Int. Cl.$^5$ .......................... B30B 3/04; D21G 9/00
[52] U.S. Cl. ...................................... 100/53; 100/161; 100/166; 182/19; 182/113; 425/367; 425/DIG. 235
[58] Field of Search ............ 100/53, 102, 161, 162 R, 100/163 R-167; 425/213, 367, DIG. 235; 182/19, 112, 113

[56] References Cited

FOREIGN PATENT DOCUMENTS 228734 12/1958 Australia .............................. 100/161

Primary Examiner—Stephen F. Gerrity
Attorney, Agent, or Firm—Darby & Darby

[57] ABSTRACT

A platform at one side of a battery of rolls in a calender can be moved up or down when the rolls are not driven or when a breastwork at the parapet of the platform is moved to a raised position so that an operator standing on the bottom wall of the platform cannot reach a nip of the rolls while the rolls are driven.

9 Claims, 2 Drawing Sheets

MOBILE PLATFORM FOR OPERATORS OF CALENDERS

FIELD OF THE INVENTION

The present invention relates to web treating machines in general, and more particularly to improvements in mobile platforms for persons in charge of inspecting, repairing, assembling and/or cleaning calenders and analogous machines for the treatment of running webs of paper, foil, textile material or the like.

BACKGROUND OF THE INVENTION

It is known to provide a supercalender with a platform which is movable up and down at one side of a battery of rolls and can support one or more attendants as well as raise or lower the person or persons thereon to a desired level where such person or persons can reach a selected roll and/or a selected nip of two neighboring rolls. In many instances, the superimposed rolls of a calender cooperate with one or more guide rollers which define, for a running web of paper or the like, a meandering path extending through the nip of certain neighboring rolls as well as around one or more guide rollers. On most cases such a platform is provided on both sides of the supercalender. The platform is movable up and down at that side of the battery of rolls which confronts the guide roller or rollers. The platform is provided with a parapet which faces the one side of the battery of rolls and has a height such that an operator standing on the platform and leaning over the parapet can reach a selected roll, a selected guide roller and/or a selected nip of a pair of neighboring rolls in response to lifting or lowering of the platform to a particular level. Such platforms are practical because all an operator has to do is start a motor which drives the platform up or down until the platform reaches a level which is most convenient to afford access to a particular part of the calender, i.e., to a selected roll, to a selected nip and/or to a selected guide roller.

It is often necessary to carry out repair, maintenance and/or other work upon certain parts of a calender while the machine is in operation. This can result in serious injury to a careless person, e.g., to an operator who attempts to reach the nip of two selected rolls while the rolls are driven to advance a web of paper or the like along the predetermined path. Those levels of the platform at which an operator occupying the platform risks injury because the operator can lean over the parapet of the platform in order to reach a selected part of the machine are called danger levels because they are particularly dangerous to a careless, unskilled or tired operator while such person attempts to reach a dangerous zone (e.g., a nip) while the machine is in operation, i.e., in the process of advancing a web along a preselected path. The danger to an operator is particularly pronounced at a level where the operator can reach a web which is driven in a direction from the parapet of the platform toward the adjacent nip of two rolls.

It has been proposed to prevent access to one or more nips of rolls in a supercalender or an analogous web treating machine (hereinafter called calender for short) by providing a barrier or guard which prevents entry of fingers into that nip, at least into those nips which receives a web portion running away from an operator on the platform. A suitable guard is disclosed, for example, in commonly owned U.S. Pat. No. 4,867,055 granted Sep. 19, 1989 to Egon Hütter et al. for "Guard for the nips of rolls in calenders". As a general rule, the guard must extend in front of an entire nip, namely all the way from one end to the other end of each of the two rolls which define the nip. In many instances, the guard must be designed to define with each of the adjacent rolls a very narrow clearance having a width not in excess of 8 mm. This narrow clearance requirement creates problems when the nip is very long because the weight of the central portion of the guard causes the respective portion of the guard to flex downwardly with the result that the width of the upper clearance increases above 8 mm while the width of the central portion of the lower clearance is decreased accordingly, e.g., in some cases all the way to zero. Moreover, the width of the clearances between the guard and the adjacent rolls can vary in response to temperature changes. Consequently a guard is not an ideal solution for the problem of preventing injury to workmen attending to calenders having rolls of considerable length, i.e., to calenders where the width of the upper clearance between a platform and the adjacent roll is excessive and the width of the lower clearance between the guard and the adjacent roll is too small.

OBJECTS OF THE INVENTION

An object of the present invention is to provide a novel and improved apparatus for reducing the likelihood of, or preventing injury to persons in charge of inspecting, repairing and/or otherwise attending to calenders and/or other types of web treating machines.

Another object of the present invention is to provide a protecting apparatus which need not resort to one or more permanently installed guards.

A further object of the invention is to provide an apparatus whose reliability is not conditioned upon temperature changes.

An additional object of the invention is to provide a novel and improved mobile platform for use in calenders and other types of web treating machines.

Still another object of the present invention is to provide a platform which is constructed, assembled and operated in such a way that it automatically prevents an occupant from reaching moving parts of the machine when the platform is located at or approaches or is in the process of moving away from one or more danger levels.

A further object of the invention is to provide a platform which can be installed in existing calenders or analogous web treating machines and whose operation can be caused to conform to the height and reach of an operator.

Another object of the invention is to provide a calender or an analogous machine which embodies one or more platforms.

An additional object of the invention is to provide a novel and improved method of protecting from injury one or more workers in charge of attending to a calender or an analogous machine while the machine is in actual use.

Still another object of the invention is to provide novel and improved controls for the mobile platform which is used in a calender or an analogous web treating machine.

A further object of the invention is to provide a platform which is designed to enable an occupant to gain access to any desired part of a web treating machine while the machine is idle but prevents such occupant from reaching the dangerous part or parts of the machine when the latter is in actual use.

SUMMARY OF THE INVENTION

The present invention provides a novel and improved platform which can be used in a web treating machine (e.g., in a supercalender) wherein a battery of rolls which are disposed at different elevations has a first side facing away from and a second side adjacent to the guide rollers. The guide rollers and the rolls form the battery of rolls and jointly define an elongated path for a running web of paper, textile material or the like. The improved platform comprises a support (e.g., a cage) at the second side of the battery of rolls, a parapet which is provided on the support and confronts the second side of the battery of rolls. A device moves the support up and down along the second side of the battery of rolls between a plurality of levels including at least one danger level at which a person occupying the support and reaching over the parapet toward the battery of rolls is apt to be injured by the rolls. A breastwork is provided on the support at the parapet. A device for raising and lowering the breastwork relative to the parapet between a plurality of different positions (including at least an uppermost and a lowermost position) in which the breastwork extends upwardly and beyond the parapet so that the person who occupies the support and reaches over the parapet toward the battery of rolls. is prevented by the breastwork from actually reaching the rolls of the battery in at least one of the plurality of different positions of the breastwork relative to the parapet and irrespective of the selected level of the support. In other words, it is possible to manipulate the breastwork relative to the parapet in such a way that the parapet can assume, at the danger level of the support, a position such that the person occupying the support and attempting to reach the rolls of the battery is prevented from doing so by the breastwork which can be said to constitute an upward extension of the parapet.

The support comprises a bottom wall and the parapet extends above the bottom wall a distance less than the height of a person of average height. Furthermore, the parapet is disposed at a preselected distance from the second side of the battery, namely at a preselected distance which ensures that a person of average height standing on the bottom wall can reach over the parapet in order to perform work at the second side of the battery of rolls at levels of the parapet other than the at least one danger level.

The device for raising and lowering the breastwork relative to the parapet is preferably adjustable, and the adjusting means for such raising and lowering means is preferably designed to carry out adjustments in accordance with the equation $$D_1 = \overline{(F \& H \vee \overline{H})} = (\overline{F} \vee \overline{H}) \& H = \overline{F} \& H$$

wherein F can constitute a signal which denotes a level of the support other than at least one danger level, H denotes that at least some of the rolls which constitute the battery are driven by a prime mover, $\overline{F}$ is the inverse of F, $\overline{H}$ is the inverse of H, & denotes a logical AND connection, and v denotes a logical OR connection.

The adjusting device can further comprise a device for permitting a lowering of the breastwork only in accordance with the equation $$E_2 = (\overline{H} \vee H \& F) \& S$$

wherein S denotes that the breastwork is raised relative to the parapet.

The adjusting means can also comprise means for permitting rotation of at least some rolls by the prime mover only when $E_3 = S \vee F$.

Still further, the adjusting means can comprise means for activating the moving means to move the support along the second side of the battery of rolls only when $E_4 = S \vee \overline{H}$.

The platform can further comprise at least two devices for monitoring the levels of the support, and each such monitoring device includes a device for generating first signals in response to movement of the support to levels other than the at least one danger level. Still further, such platform can comprise a device (e.g., an AND gate) for generating a second signal (F) in response to generation of a first signal by the signal generating device of each monitoring device. At least one of the monitoring devices preferably comprises a radiation reflecting sensor.

The novel features which are considered as characteristic of the invention are set forth in particular in the appended claims. The improved platform itself, however, both as to its construction and the mode of operating the same, together with additional features and advantages thereof, will be best understood upon perusal of the following detailed description of certain presently preferred specific embodiments with reference to the accompanying drawings.

BRIEF DESCRIPTION OF THE DRAWING

The above and still further objects, features and advantages of the present invention will become apparent upon consideration of the following detailed description of presently preferred embodiments thereof, especially when taken in conjunction with the accompanying drawings wherein like reference numerals in the various figures are utilized to designate like components, and wherein.

FIG. i is a fragmentary schematic side elevational view of a supercalender and a schematic side elevational view of a platform which is constructed and operated in accordance with the present invention.

DETAILED DESCRIPTION OF PREFERRED EMBODIMENTS

Figure 1:
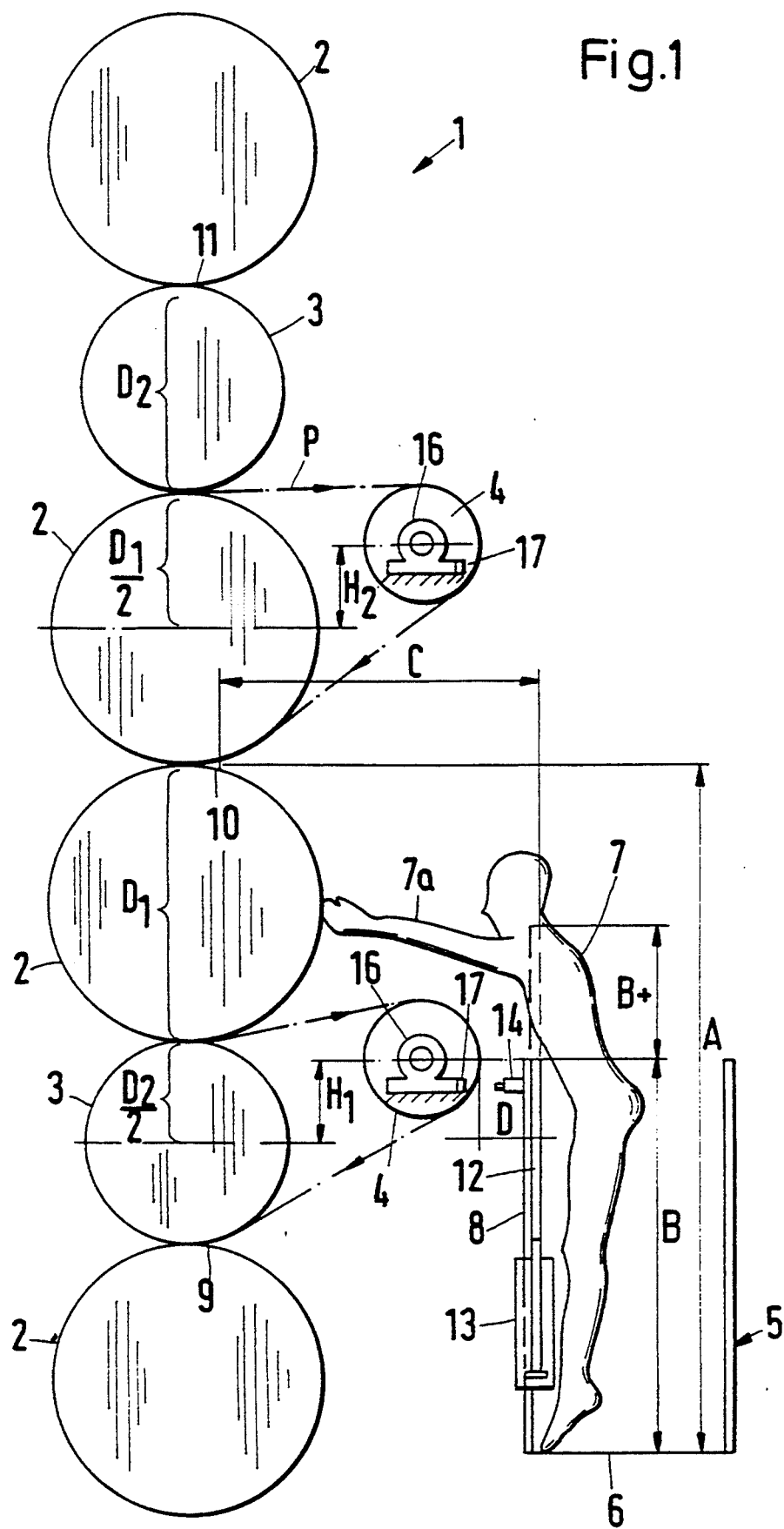

Referring now to FIG. 1 a portion of a web treating machine 1, which constitutes a supercalender (hereinafter called calender for short) can be used to treat a continuous running web P of paper, metallic or plastic foil, textile material or the like, is illustrated. The calender 1 comprises a battery of rolls including several pairs of rolls 2, 3 which are disposed at different elevations or levels above the floor (not shown). The left-hand side of the battery of rolls 2, 3 can face a wall (not shown) or the rear side of an adjoining battery of rolls, and the right-hand side of such battery confronts a set of guide rollers 4 as well as a mobile platform which is constructed, mounted and operated in accordance with a feature of the present invention. The axes of the rolls 2, 3 can but need not be located in a single (con, non) vertical plane. Usually on the other side of the calender another platform and a similar set of guide rollers is provided (not shown).

The rolls 2 have at least one elastic outer layer and, therefore, are conventionally referred to in the relevant industry as elastic rolls. The smaller-diameter rolls 3 have non-elastic outer layers and are known as hard rolls. The nip of the lowermost pair of rolls 2, 3 is shown at 9, the nip of the median pairs of rolls 2, 2 is shown at 10, and the nip of the uppermost pair of rolls 2, 3 is shown at 11. These nips are located at the so-called danger levels because the hand or hands of an attendant 7 standing on the bottom wall 6 of a support 5 forming part of the novel platform can be injured by being entrained into one of the nips 9, 10 and 11, e.g., due to the pull of the web P while a portion of the web P advances from the vertical plane of the platform toward the nip 9, 10 or 11. The web P can be subjected to a calendering, embossing, stretching and/or other quality enhancing treatment. The path of the running web P is indicated by arrows; such path extends through the nip 11, about the upper guide roller 4, through the nip 10, about the lower guide roller 4 and into and through the nip 9. The path can be lengthened or shortened by removing or by adding or deactivating one or more pairs of rolls 2, 3 and/or by removing or adding or deactivating one or more guide rollers 4 and/or in any other suitable way. The bias of the pairs of rolls 2, 3 to compress the web P in the nip 9, 10 and/or 11 can be adjusted in a manner that does not form part of the present invention because such adjustment is well known in the art.

The support 5 of the improved platform is movable up and down along a vertical or nearly vertical path at the righthand side of the battery of rolls 2, 3, namely at the side which confronts the guide rollers 4. The path of the platform, including the support 5 and the bottom wall 6 of the support, is or can be parallel to the common plane of the axes of the rolls 2 and 3. The support 5 is illustrated in FIG. 1 being disposed at a non-dangerous or less dangerous level at which an outstretched hand 7a of the operator 7 standing on the bottom wall 6 can reach one of the median rolls 2 but not any one of the danger levels (i.e., nips 9, 10 and 11). The operator 7, who preferably is of average height, can extend at least one of his or her hands 7a over a stable, fixedly mounted front wall or parapet 8. Parapet 8 is preferably of one piece constructed with, or otherwise is securely attached to, the bottom wall 6 at that side or surface of the bottom wall which faces the guide rollers 4 and the right-hand side of the battery or rolls 2, 3. The height B of the parapet 8 is designed such that, in the absence of any upward extension, or in the absence of movability, of the parapet in a direction away from the bottom wall 6, the person 7 could readily reach one of the median rolls 2 and/or the lowermost roll 3 and/or the danger level (nip) 9. Thus, that portion of the web P which advances from the lower guide roller 4 toward the nip 9 could entrain a hand and/or the garment of an attendant standing on the bottom wall 6, or a prime mover 20 for the rolls 2, 3 would cause a hand which engages the exposed right-hand side or surface of one of the median rolls 2 to enter the danger zone 10 (i.e., the nip 10). The uppermost portion of the parapet 8 is located at, or at least close to, the horizontal plane of the axis of the lower guide roller 4. At such time, the bottom wall 6 is located at a distance A from a horizontal plane that includes the nip 10. The distance A exceeds the height of an attendant 7 on the base plate 6. The distance C between the vertical plane common to the axes of the rolls 2, 3 (or a vertical plane close to such common plane) and the vertical plane of the parapet 8 is in this embodiment slightly less than the height B of the parapet 8. The relatively short distance D between the vertical plane of the parapet 8 and a vertical plane tangential to the guide rollers 4 is substantially less than the distance B or C. As a general rule, the distance D is designed to be large enough, so that the operator 7 cannot introduce his or her hand between the parapet 8 and the adjacent guide roller 4, but small enough that the operator cannot put her or his hand in the nip 9 below.

The distances A, B, C and D are (or can be) standardized. In selecting the standardized values of such distances, the designer of the improved platform will further take into consideration the diameters $D_1$ of the rolls 2, the diameters $D_2$ of the rolls 3 and/or the average height (a little more than B plus B+) of an operator 7.

In accordance with another feature of the present invention, the improved platform further comprises a device for arresting (and/or permitting the stoppage of) the support only in certain portions of the vertical path for the platform, namely in those portions in which an operator cannot reach over the parapet 8 and all the way into one of the danger zones (nips 9, 10 and 11). Such a device for arresting or for permitting stoppage of the platform includes a breastwork 12 having a height B+ which is movable upwardly and beyond the parapet 8 between a plurality (e.g., an infinite number) of positions (including an uppermost and a lowermost position) at levels above or beyond the uppermost portion of the parapet. The device 13 (FIG. 2) for raising and lowering the breastwork 12 includes a motor-driven transmission (e.g., a gearing) on the parapet 8. A fluid-operated (hydraulic or pneumatic) mechanism, which is carried by the parapet 8, is preferably used to raise or lower the breastwork 12. In the embodiment illustrated in FIG. 1, the device 13 has raised the breastwork 12 to a level at a distance of B+ beyond the distance B. The distance B+ is selected with a view to ensure that the person 7 standing on the bottom wall 6 can reach one or more parts at the right-hand side of the battery of rolls 2, 3 but not the parts, such as the nip 10, which are at one of the several danger levels.

The support 5 carries at least two sensors 14 which are designed to monitor the level of the platform. Only one of the sensors 14 is shown in FIG. 1 because the other sensor 14 is located directly behind (i.e., at the same level) as the illustrated sensor. In a preferred embodiment, each sensor 14 can constitute a photoelectronic detector with a radiation source and a photoelectronic transducer. The radiation source is mounted on the parapet 8 and directs one or more beams of radiation against one or more reflectors (mirrors) 17 on the frame 16 of the adjacent guide roller 4. When the radiation which is reflected by the mirror 17 impinges upon the transducer of the respective sensor 14, the output of the transducer generates a signal denoting that the web P which is being unwound from the source (e.g., a bobbin) of such web can be touched at a location where the web is accessible from the platform and the operator can reach the roll 2 or in another position of the platform 6 the roll 3, without the risk that the operator is injured by a dangerous nip. Thus, the operator 7 can lean over the parapet 8 (while the breastwork 12 is held in the lower end position) because the operator cannot reach the nip 9, 10 or 11 even though the breastwork 12 is not effective, i.e., it does not contribute to the ability of the parapet 8 to limit the range of the hands 7a of the operator 7 on the bottom wall 6 of the support 5. The transducer of each sensor 14 is disposed adjacent to the respective radiation source. The second sensor 14 is or can be identical with the sensor 14 of FIG. 1 and its radiation source directs one or more beams of radiation upon the illustrated mirror 17 or upon a discrete second mirror on the frame 16 for the lower guide roller 4 of FIG. 1.

The exact mounting of the guide rollers 4 relative to the nips 9, 10 and 11 will depend upon the model of the calender 1 that is used. Thus, the distance $H_1$, from the horizontal plane of the axis of the lower guide roller 4 to the horizontal plane of the axis of the lowermost roll 3 is a characteristic of the illustrated calender 1 but Hi needs not be the same for different calenders. The same applies for the distance $H_2$, from the horizontal plane of the axis of the upper guide roller 4 to the horizontal plane of the axis of the adjacent (median) roll 2. Applicant has found that the dimensions A and B are quite satisfactory if they are selected in accordance with the following formula (it being assumed here that the topmost portion of the parapet 8 is located in, or at least close to, the horizontal plane of one of the guide rollers 4 when the platform is not disposed at one of the danger levels (nips 9, 10, 11):

$$D_1 + D_2/2 - H_1 \geq A - B$$

$$D_2 + D_1/2 - H_1 \geq A - B$$

In the above formula, $D_1$ is the diameter of an elastic roll 2 plus a relatively small additional distance, which corresponds to twice the thickness(es) of that layer or those layers at the periphery of roll 2 which is or are removed as a result of a single treatment or two or more treatments to enhance the quality of the peripheral surface of the roll 2. $D_2$ is the (at least substantially) unchanged diameter of hard roll 3.

Figure 2:
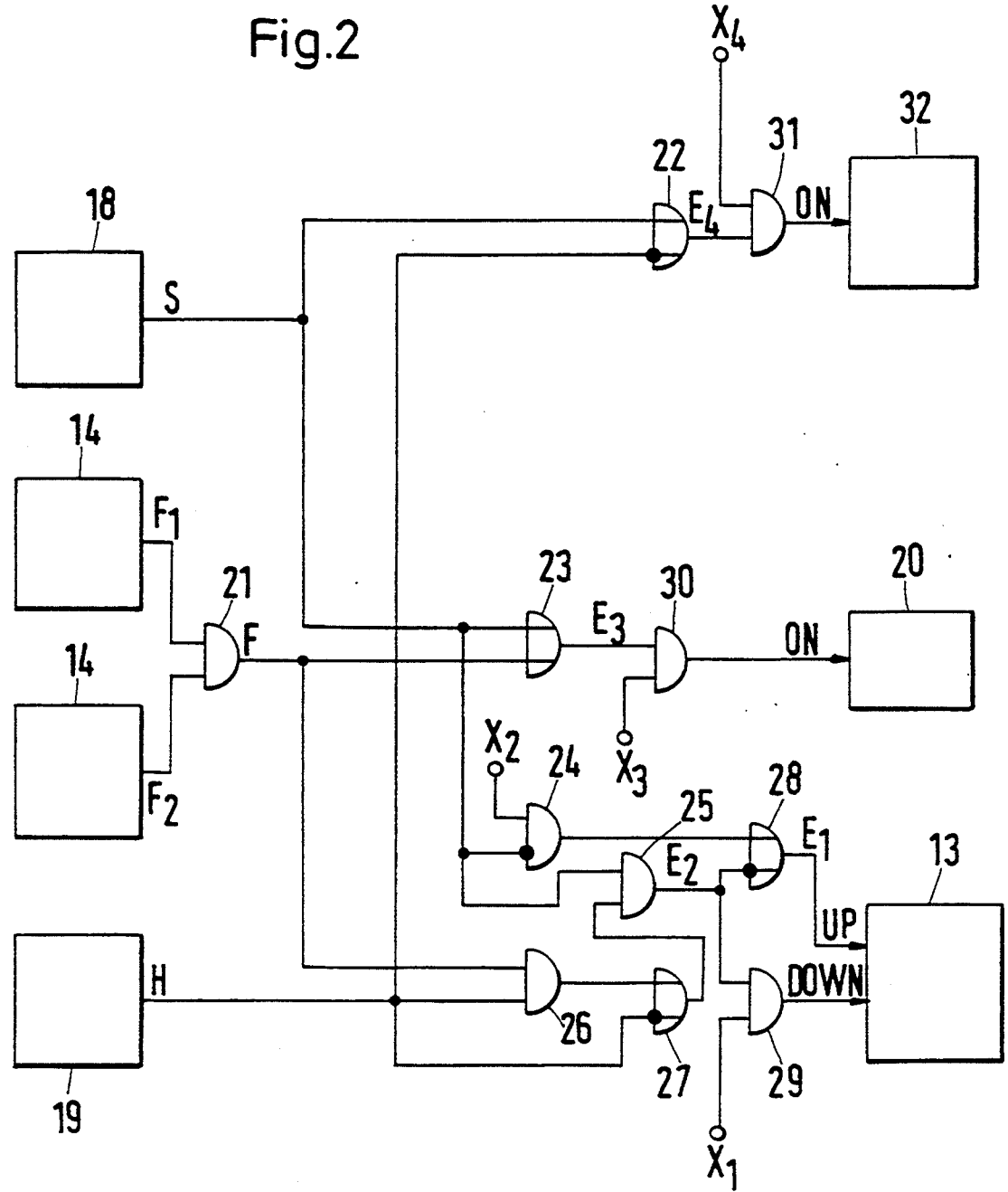
FIG. 2 is a circuit diagram of the controls for the supercalender and for the platform.

The controls for operating and adjusting the adjustable device 13 for raising and lowering the breastwork 12 relative to the parapet 8, the prime mover 20 for the rolls 2, 3 and a device 32 for moving the support 5 up and down are shown schematically in FIG. 2. These controls include the aforementioned sensors 14 whose transducers transmit signals $F_1$ and $F_2$ to the corresponding inputs of an AND gate 21 having an output for signals F. The transducers of the sensors 14, 14 transmit signals $F_1$ and $F_2$ when the support 5 is located at a level other than a danger level. The controls of FIG. 2 further include a sensor 18 which generates a signal S when it ascertains that the breastwork 12 is located at a level such that it extends above the uppermost portion of the parapet 8. Still further, the controls include a sensor 19 which monitors the prime mover 20 and transmits a signal H when the prime mover 20 is on, i.e., when the rolls 2 and 3 are driven.

The AND gate 21 transmits a signal F when its two inputs receive the signals $F_1$ and $F_2$. Thus, the presence of a signal F denotes that the support 5 is located at a "safe" level. The controls can employ more than two sensors 14; the AND gate 21 is then provided with a larger number of inputs, one for each sensor 14.

The signal S at the output of the sensor 18 is transmitted to one input of an implication (IF-THEN) gate 22, to one input of an OR gate 23, to the inverting input of an inhibit gate 24, and to one input of an AND gate 25.

The signal F at the output of the AND gate 21 is transmitted to the second input of the OR gate 23 and to one input of art AND gate 26.

The signal H at the output of the sensor 19 is transmitted to the inverting input of the implication gate 22, to the second input of the AND gate 26 and to the inverting input of a further implication gate 27. The output of the AND gate 26 is connected with the non-inverting input of the implication gate 27.

The signal at the output of the implication gate 27 is transmitted to the second input of the AND gate 25, and the output of the AND gate 25 is connected with the inverting input of an implication gate 28 as well as with one input of an AND gate 29.

The second input of the AND gate 29 can receive a signal $X_1$ from the operator 7 on the bottom wall 6 of the support 5 when the operator actuates a switch for the purpose of starting the raising and lowering device 13 in a direction to lower the breastwork 12 relative to the parapet 8.

The output of the inhibit gate 24 is connected with the non-inverting second input of the implication gate 28, and the output of the AND gate 26 is connected with the non-inverting second input of the implication gate 27.

The non-inverting input of the inhibit gate 24 can receive a signal $X_2$ when the operator actuates a switch to start the raising and lowering device 13 in a direction to raise the breastwork 12 relative to the parapet 8.

The output of the OR gate 23 is connected with one input of an AND gate 30, and the second input of this AND gate can receive a signal $X_3$ when the operator actuates a switch for the purpose of starting the prime mover 20 of the calender 1.

The output of the implication gate 28 is connected to the input "UP" of the raising and lowering device 13 in order to start the raising and lowering device in a sense to move the breastwork 12 upwardly with respect to the parapet 8. The output of the AND gate 29 is connected with the input "DOWN" of the raising and lowering device 13 so that, when this input receives a signal from the AND gate 29, the breastwork 12 is started in a sense to move downwardly relative to the parapet 8. The output of the AND gate 30 is connected with an input "ON" of the prime mover 20, i.e., the prime mover 20 is started to rotate the rolls 2, 3 when its input "ON" receives a signal from the gate 30.

The output of the implication gate 22 is connected with one input of an AND gate 31, and the other input of this AND gate can receive a signal $X_4$ which is generated in response to closing of a switch (not shown) for the purpose of starting the device 32 for moving the support 5 up and down. The output of the AND gate 31 is connected with the "ON" input of the moving device 32.

The operation of the controls shown in FIG. 2 is as follows:

If the support 5 assumes a position other than at one of the danger levels (nips 9, 10, 11), the output of the AND gate 21 transmits a signal F (1-signal). If the sensor 19 ascertains, at the same time, that the prime mover 20 is on (i.e., that the calender 1 is in operation in that the rolls 2 and 3 are rotated), the output of the sensor 19 transmits a signal H (1-signal). This causes the AND gate 26 to transmit an l-signal which is transmitted to the non-inverting input of the implication gate 27; consequently, the latter transmits an l-signal to the corresponding input of the AND gate 25. Though the inverting input of the implication gate 27 also receives an l-signal (i.e., the signal H), this does not influence the l-signal at the output of the implication gate 27. If the sensor 18 ascertains that the breastwork 12 has been moved upwardly, the output of the sensor 18 transmits an 1-signal which is applied to the other input of the AND gate 25, i.e., the output of the gate 25 transmits an 1-signal to the corresponding input of the AND gate 29 which means that the controls satisfy the terms of the equation $$E_2 = (\overline{H} \vee H \ \& \ F) \ \& \ S.$$

If the operator 7 thereupon closes the aforementioned switch to generate a signal $X_1$ (1-signal), the input "DOWN" of the raising and lowering device 13 receives an 1-signal which causes the raising and lowering device 13 to lower the breastwork 12 relative to the parapet 8. Though the inverting input of the implication gate 28 receives an 1-signal at the same time, this does not result in the transmission of an 1-signal at the output of the gate 28 as long as the breastwork 12 is in the process of moving upwardly. In other words, the output of the implication gate 28 does not transmit an 1-signal as long as the sensor 18 transmits an 1-signal S which entails the transmission of an 0 signal at the output of the inhibit gate 24 so that the signal at the output of the implication gate 28 is also zero. However, when the equation $E_2$ is no longer satisfied because the inverting input of the implication gate 28 receives a zero signal or because the breastwork 12 has descended to its lowermost position so that the output of the sensor 18 transmits a zero signal and one input of the inhibit gate 24 does receive a signal $X_2$, the switching function $E_1$ in the form of an 1-signal at the output of the implication gate 28 is satisfied so that the "UP" input of the raising and lowering device 13 receives an 1-signal to start moving the breastwork 12 upwardly. At the same time, the "DOWN" input of the raising and lowering device 13 receives a zero signal which is transmitted by the output of the AND gate 29 irrespective of whether or not one input of the AND gate 29 receives the signal $X_1$ because the terms of the equation $E_2$ are not met due to the fact that the output of the sensor 18 does not transmit an 1-signal S. In other words, the breastwork 12 is automatically moved upwardly when the terms of the equation $$E_1 = \overline{(F \ \& \ H \vee \overline{\overline{H}})} = (\overline{F} \vee \overline{H}) \ \& \ H = \overline{F} \ \& \ H$$

are satisfied. On the other hand, the breastwork 12 is lowered when the terms of the preceding equation are satisfied and the operator causes the transmission of a signal $X_1$ at the same time.

If the sensor 18 transmits an 1-signal S or the output of the AND gate 21 transmits an 1-signal F, the terms of the equation $E_3 = S \vee F$ are met so that the output of the implication gate 22 transmits an 1-signal to the corresponding input of the AND gate 30. The output of the AND gate 30 then transmits an 1-signal to the "ON" input of the prime mover 20, i.e., the prime mover 20 is started provided that the other input of the AND gate 30 simultaneously receives an 1-signal $X_3$. In other words, the prime mover 20 can be started (in response to the transmission of signal $X_3$) only when the breastwork 12 is raised or the support 5 assumes a position other than at one of the danger levels.

However, if the breastwork 12 is lifted (this is indicated by an 1-signal S at the output of the sensor 18) but the sensor 19 ascertains that the prime mover 20 is idle (i.e., that the rolls 2, 3 do not rotate), namely that the output of the sensor 19 transmits an 0-signal H, the terms of the equation $E_4 = S \vee \overline{H}$ are met. Consequently, the output of the implication gate 22 transmits an 1-signal which is applied to the corresponding input of the AND gate 31. If the other input of the AND gate 31 simultaneously receives a signal $X_4$, the output of this gate transmits an 1-signal which is applied to the input "ON" of the moving device 32, i.e., the moving device 32 proceeds to move the support 5. It will be seen that the moving means 32 for the support 5 can be started only (in response to generation of a signal $X_4$) when the breastwork 12 is raised or when the prime mover 20 is idle.

The aforedescribed mode of regulating the movements of the support 5 renders it possible to dispense with guards for the nips 9, 10 and 11 because the support 5 can be brought to a halt, and the breastwork 12 can be lowered, only when the support is located at a level other than one of the danger levels. However, if the prime mover 20 is idle (i.e., when the rolls 2, 3 are not driven and the web P is not advanced along its path), the support 5 can be moved to any desired level and the breastwork 12 can be raised or lowered at will. This renders it possible to widen the nips 9, 10, 11 and to thereupon thread the web P into the predetermined path in the customary way.

To summarize, the breastwork 12 is lifted when the support 5 is moved to one of the danger levels while the prime mover 20 is on. Also, the breastwork 12 can be lowered by an operator 7 only when the prime mover 20 is idle or when the prime mover 20 is on, but the support 5 is located at a level other than one of the danger levels. Thus, the controls of FIG. 2 automatically ensure that the attendant 7 standing on the bottom wall 6 cannot reach the nip 9, 10 or 11 when the support 5 is arrested at one of the danger levels.

Additional safety requirements are met because the controls of FIG. 2 ensure that the prime mover 20 can be started only when the reruns of the equation $E_3 = S \vee F$ are satisfied. Thus, the calender 1 can be started only when the breastwork 12 is raised or the support 5 assumes a position other than at one of the danger levels.

The safety can be enhanced still further in that the controls ensure that the device 32 for moving the support 5 up or down can be started only when the provisions of the equation $E_4 = S \vee \overline{H}$ are satisfied. This means that the moving device 32 can be started only when the breastwork 12 is raised or the calender 1 is idle.

The provision of at least two sensors (14) which transmit signals ($F_1$ and $F_2$) in response to movement of the support 5 to a level other than one of the danger levels and which transmit the signals ($F_1$ and $F_2$) to the AND gate 21, so that the latter can transmit the signal F when each of its inputs receives a signal, constitutes a desirable feature of the presently preferred controls for the improved calender. The utilization of two or more sensors 14 contributes to safety of the calender in the case of intentional improper manipulation because it is more difficult to simultaneously actuate two or more sensors 14 except under the aforedescribed circumstances when the sensors 14 are actuated in automatic response to movement of the support 5 to a level other than one of the danger levels. In addition, the operator 7 is not endangered as a result of defectiveness of one of two or more sensors 14.

The improved platform and its controls are susceptible of numerous additional modifications. For example, it is possible to rely on Boolean calculations and replace the functions $E_1$ to $E_4$ with other types of logic elements, e.g., exclusively with suitably interconnected NOR and NAND gates.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A web treating machine comprising:
   a battery of rolls having a first side and a second side, each of said rolls being disposed at different elevations;
   at least one guide roller being disposed adjacent to said first side of said battery of rolls, said battery of rolls and said at least one guide roller defining an elongated path for a running web;
   a platform comprising a support, said platform being disposed adjacent to said first side of said battery of rolls;
   a parapet being disposed on said support;
   means for moving said support up and down along said first side between a plurality of levels;
   a breastwork being disposed on said support adjacent to said parapet; and
   means for raising and lowering said breastwork relative to said parapet between a plurality of positions including an uppermost and a lowermost position, said breastwork extending beyond said parapet in at least one of said plurality of positions to prevent a person occupying said support from reaching over said parapet and contacting said battery of rolls irrespective of the level of said support.

2. The machine of claim 1, wherein said support comprises a bottom wall, said parapet is disposed at a preselected distance from said first side of said battery of rolls such that said person can reach over said parapet to perform work at said first side of said battery at predetermined levels of said support.

3. The machine of claim 2, wherein said means for raising and lowering said breastwork relative to said parapet is adjustable in accordance with the equation $$E_1 = \overline{(\overline{F} \& H \vee \overline{H})} = (\overline{F} \vee \overline{H}) \& H = \overline{F} \& H$$

wherein F denotes a level of said support other than said at least one danger level, H denotes that at least some of the rolls in the battery are driven by a prime mover, $\overline{F}$ is the inverse of F, $\overline{H}$ is the inverse of H, & denotes a logical AND connection, and v denotes a logical OR connection, said equation $E_1$, being satisfied when $E_1$ is equal to an 1-signal.

4. The machine of claim 3, wherein said adjusting means comprises means for permitting a lowering of the breastwork only in accordance with the equation $$E_2 = (\overline{H} \vee H \& F) \& S$$

wherein S denotes that the breastwork is raised relative to said parapet, said equation $E_2$, being satisfied when $E_2$ is equal to an 1-signal.

5. The machine of claim 4, wherein said adjusting means includes means for permitting rotation of the at least some rolls by the prime mover only when $$E_3 = S \vee F$$

said equation $E_3$, being satisfied when $E_3$ is equal to an 1-signal.

6. The machine of claim 4, wherein said adjusting means comprises means for activating said moving means to move said support along said side of the battery of rolls only when $$E_4 = S \vee \overline{H}$$

said equation $E_4$, being satisfied when $E_4$ is equal to an 1-signal.

7. The machine of claim 1, further comprising at least one nip being disposed between adjacent rolls, a plurality of means for monitoring the levels of said support including means for generating signals in response to movement of said support to levels corresponding to those other than said at least one nip, and means for generating a second signal in response to the generation of said first signal by the signal generating means of each of said monitoring means.

8. The machine of claim 7, wherein said means for generating a second signal comprises an AND gate.

9. The machine of claim 7, wherein at least one of said monitoring means comprises a radiation reflecting sensor.

* * * * *